(No Model.)

J. N. HAZELIP.
CHILD'S CARRIAGE.

No. 253,601. Patented Feb. 14, 1882.

WITNESSES.

INVENTOR

UNITED STATES PATENT OFFICE.

JOSEPH N. HAZELIP, OF BALTIMORE, MARYLAND.

CHILD'S CARRIAGE.

SPECIFICATION forming part of Letters Patent No. 253,601, dated February 14, 1882.

Application filed October 28, 1881. (No model.)

*To all whom it may concern:*

Be it known that I, JOSEPH N. HAZELIP, of Baltimore city, State of Maryland, have invented certain new and useful Improvements in Children's Carriages; and I hereby declare the same to be fully, clearly, and exactly described as follows, reference being had to the accompanying drawings, in which—

Figure 1:
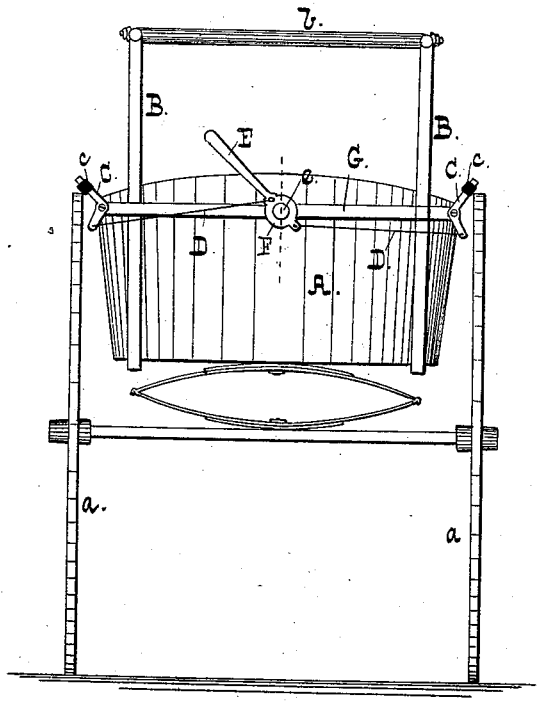
Figure 2:
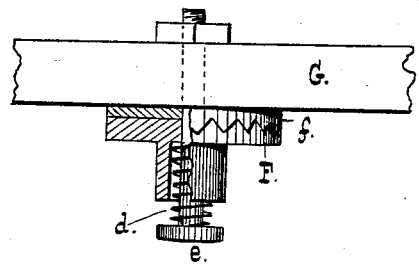

Figure 1 is a rear elevation of a carriage embodying my present improvement. Fig. 2 is a plan, partly in section, of the clamp for the brake.

The object of my invention is to provide a brake mechanism for children's carriages, arranged to be thrown into engagement with the wheels by the attendant whenever it becomes necessary to leave the carriage, and prevent the latter from running down the grade of the sidewalk and into the gutter, as so frequently occurs with carriages unprovided with mechanism for locking the wheels. To this end I provide a lever conveniently located behind the carriage-body and below the push-bar, and connected by wires with bell-crank levers at either side, which latter are arranged to bear upon the wheels.

In the drawings, A is the body of the carriage, $a\ a$ the wheels, B B the standards, and $b$ the push-bar, all of the usual construction.

To the standards B is secured a transverse bar, G, having pivoted in either end a bell-crank lever, C, armed with a brake-shoe, $c$. The latter is conveniently made by springing a section of rubber hose upon the lever C.

E is a handle attached to a disk, F, that is pivoted upon the bar G, and is connected above and below its pivot with the levers C by wires D. A disk, $f$, is rigidly secured to the bar G, and the disk F is normally thrust toward the disk $f$ by means of a spring, $d$, coiled between the outer disk and the head $e$ of the bolt. Both disks are radially corrugated, so as to engage with each other.

Instead of pivoting the lever and disk to the bar G, they may be pivoted to one of the standards and attached to a single brake-lever pivoted to the other standard and arranged either to press upon the periphery of the wheel or engage with its spokes; or, in lieu of levers C, one or more rods may be thrust directly outward into engagement with the wheel or wheels.

In operation, to apply the brake the lever E is thrown over to the right, bringing the brake-shoes down upon the wheels, where, when the lever is released, they are held by the automatic clamping of the disks F $f$. To release the brakes the lever is simply thrown over to the left. The elastic shoes $c$ yield sufficiently to insure an adequate pressure upon the wheels, which might not and probably would not result were they absent.

What I claim, and desire to secure by Letters Patent, is—

1. In combination with the lever E and clamp, the bell-crank levers C, as and for the purpose set forth.

2. In combination with the rear standards and cross-bar, the brake-levers pivoted thereon and connected with the lever E, as set forth.

3. In combination with the lever E and clamping-disks F $f$, the bell-crank levers C, having shoes $c$, and the wires D, as set forth.

JOSEPH N. HAZELIP.

Witnesses:
R. D. WILLIAMS,
J. N. PISTEL, Jr.